United States Patent
Pham

(10) Patent No.: US 11,095,639 B2
(45) Date of Patent: Aug. 17, 2021

(54) METHODS, SYSTEMS, AND MEDIA FOR AUTHENTICATING USERS USING BIOMETRIC SIGNATURES

(71) Applicants: Synergex Group, Greenwich, CT (US); Wayne Taylor, Chandler, AZ (US); Pham Holdings, Inc., Lacey, WA (US)

(72) Inventor: Thien Van Pham, Lacey, WA (US)

(73) Assignees: Synergex Group, Greenwich, CT (US); Pham Holdings, Inc., Lacey, WA (US); Wayne Taylor, Chandler, AZ (US)

( * ) Notice: Subject to any disclaimer, the term of this patent is extended or adjusted under 35 U.S.C. 154(b) by 0 days.

(21) Appl. No.: 15/593,037

(22) Filed: May 11, 2017

(65) Prior Publication Data

US 2018/0332034 A1   Nov. 15, 2018

(51) Int. Cl.
 *H04L 29/06*  (2006.01)
 *G06F 21/32*  (2013.01)
(52) U.S. Cl.
 CPC .......... *H04L 63/0861* (2013.01); *G06F 21/32* (2013.01); *H04L 63/083* (2013.01)
(58) Field of Classification Search
 CPC ... H04L 63/0861; H04L 63/083; H04L 63/10; G06F 21/32
 USPC .......................................................... 726/4
 See application file for complete search history.

(56) References Cited

U.S. PATENT DOCUMENTS

| 7,249,177 | B1  |   | 7/2007  | Miller   |            |
|-----------|-----|---|---------|----------|------------|
| 9,967,101 | B2  | * | 5/2018  | Hartloff | H04L 9/3231 |
| 2005/0246291 | A1 |   | 11/2005 | Delgrosso et al. | |
| 2007/0061590 | A1 | * | 3/2007  | Boye ..................... G06F 21/305 713/186 |
| 2013/0132091 | A1 | * | 5/2013  | Skerpac ................ G10L 17/005 704/273 |
| 2013/0347129 | A1 | * | 12/2013 | Samuelsson ........ H04L 63/0838 726/28 |
| 2014/0337930 | A1 | * | 11/2014 | Hoyos ..................... G06F 21/34 726/4 |
| 2014/0337949 | A1 |   | 11/2014 | Hoyos | |
| 2015/0138962 | A1 | * | 5/2015  | Tipton .................. H04W 28/08 370/230 |

(Continued)

OTHER PUBLICATIONS

International Search Report and Written Opinion dated Jul. 20, 2018 in International Patent Application No. PCT/US2018/031995.

(Continued)

*Primary Examiner* — Teshome Hailu
(74) *Attorney, Agent, or Firm* — Byrne Poh LLP

(57) ABSTRACT

Methods, systems, and media for authenticating users using biometric signatures are provided. In some embodiments, the method comprises: receiving, from a user device, an indication that the user device is to be connected to a communication network; in response to receiving the indication, causing a user interface to be presented on the user device that receives a username corresponding to a user of the user device; receiving, from the user device, a biometric sample corresponding to the user of the user device; determining whether the biometric sample matches a stored biometric sample associated with the username; and in response to determining that the biometric sample matches the stored biometric sample associated with the user name, causing the user device to be connected to the communication network.

18 Claims, 8 Drawing Sheets

(56) References Cited

U.S. PATENT DOCUMENTS

2015/0363986 A1   12/2015  Hoyos et al.
2016/0070951 A1    3/2016  Mettyear et al.
2016/0164682 A1*  6/2016  Hartloff ................ H04L 9/3231
                                                                     713/186
2016/0366128 A1*  12/2016  Dascola .............. H04L 63/0861

OTHER PUBLICATIONS

Extended European Search Report dated Nov. 2, 2020 in EP Patent Application No. 18798199.8, pp. 1-9.

\* cited by examiner

METHODS, SYSTEMS, AND MEDIA FOR AUTHENTICATING USERS USING BIOMETRIC SIGNATURES

TECHNICAL FIELD

The disclosed subject matter relates to methods, systems, and media for authenticating users using biometric signatures.

BACKGROUND

People often want to connect to networks, such as a local area network or a wide area network with their user devices. In some facilities, this may require entering information, accepting an agreement, verifying the user's identity, etc. However, this process may not be secure, for example, in a public facility.

Accordingly, it is desirable to provide new methods, systems, and media for authenticating users using biometric signatures.

SUMMARY

Methods, systems, and media for authenticating users using biometric signatures are provided. In accordance with some embodiments of the disclosed subject matter, methods for authenticating users using biometric signatures are provided, the methods comprising: receiving, from a user device, an indication that the user device is to be connected to a communication network; in response to receiving the indication, causing a user interface to be presented on the user device that receives a username corresponding to a user of the user device; receiving, from the user device, a biometric sample corresponding to the user of the user device; determining whether the biometric sample matches a stored biometric sample associated with the username; and in response to determining that the biometric sample matches the stored biometric sample associated with the user name, causing the user device to be connected to the communication network.

In accordance with some embodiments of the disclosed subject matter, systems for authenticating users using biometric signatures are provided, the systems comprising: a hardware processor that is programmed to: receive, from a user device, an indication that the user device is to be connected to a communication network; in response to receiving the indication, cause a user interface to be presented on the user device that receives a username corresponding to a user of the user device; receive, from the user device, a biometric sample corresponding to the user of the user device; determine whether the biometric sample matches a stored biometric sample associated with the username; and in response to determining that the biometric sample matches the stored biometric sample associated with the user name, cause the user device to be connected to the communication network.

In accordance with some embodiments of the disclosed subject matter, non-transitory computer-readable media containing computer-executable instructions that, when executed by a processor, cause the processor to perform a method for authenticating users using biometric signatures, the method comprising: receiving, from a user device, an indication that the user device is to be connected to a communication network; in response to receiving the indication, causing a user interface to be presented on the user device that receives a username corresponding to a user of the user device; receiving, from the user device, a biometric sample corresponding to the user of the user device; determining whether the biometric sample matches a stored biometric sample associated with the username; and in response to determining that the biometric sample matches the stored biometric sample associated with the user name, causing the user device to be connected to the communication network.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for authenticating users using biometric signatures are provided.

In some embodiments, the mechanisms described herein can grant a user access to a network, such as a Local Area Network (LAN) or Wide Area Network (WAN) by authenticating the user using a biometric signatures. In some embodiments, a user can connect a user device to the network, such as through a Wi-Fi Hotspot, and can be presented with a user interface via a program or application (e.g., a Captive Portal program, and/or any other suitable program or application). The user interface can receive a username associated with the user and a biometric signature (e.g., a fingerprint, a voice signature, and/or any other suitable biometric signature) and can validate the username and the biometric signature. If the username and the biometric signature are determined to be valid, the mechanisms can allow the user device to connect to the network.

In some embodiments, the mechanisms can allow a user to create a new username and store a corresponding biometric signature for later use. For example, in some embodiments, the user can create the new username and store the biometric signature to be later used to log in to a LAN or WAN. In some embodiments, the mechanisms can receive a new username and can authenticate the user device that transmitted the new username by transmitting, from a sign-on server, a passcode to a user device and requesting that a user of the user device transmit the passcode back to the sign-on server for validation. In some embodiments, if the passcode is validated, the mechanisms can receive a biometric signature from the user of the user device for storage on the sign-in server and for future use.

Figure 1:
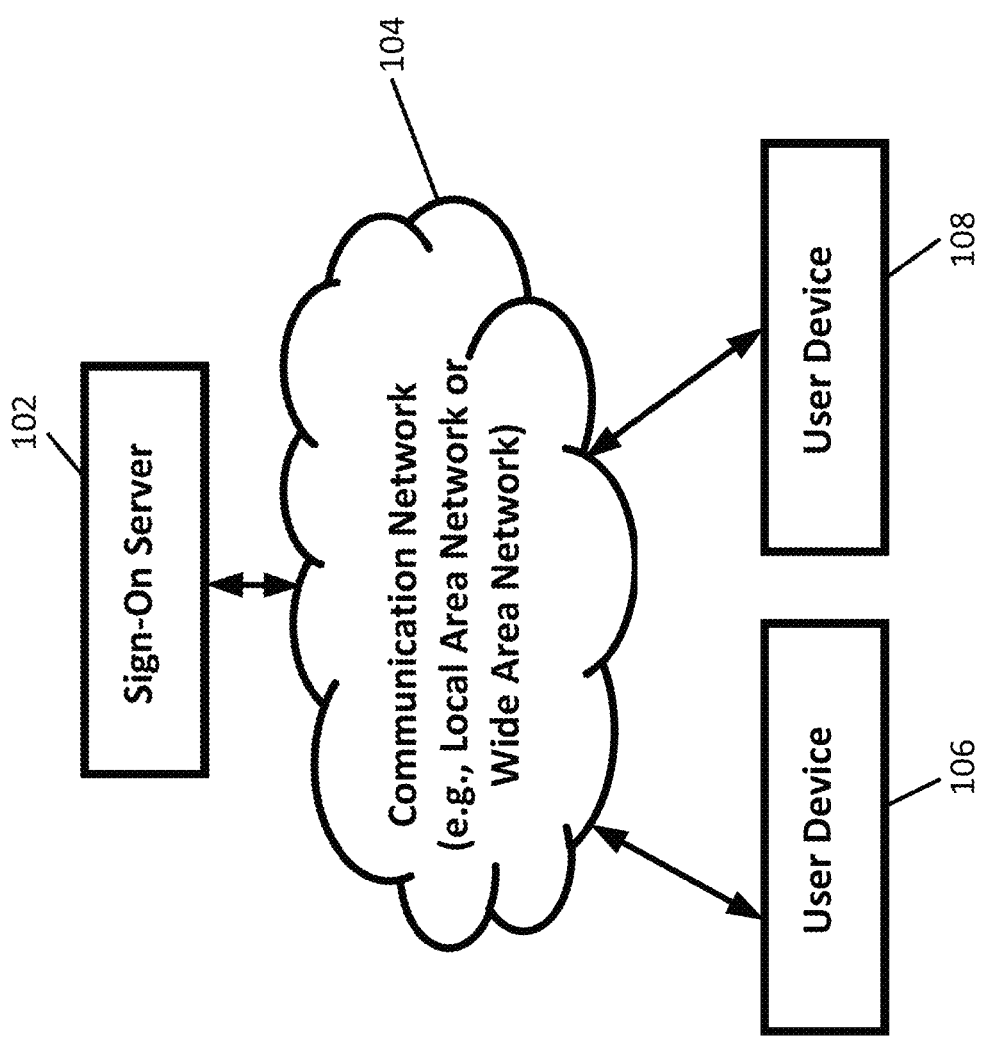
FIG. 1 shows a schematic diagram of an example of a system for authenticating users using biometric signatures in accordance with some embodiments of the disclosed subject matter.

Turning to FIG. 1, an example 100 of hardware for authenticating users using biometric signatures in accordance with some embodiments of the disclosed subject matter is shown. As illustrated, hardware 100 can include a sign-on server 102, a communication network 104, and user devices 106 and/or 108.

Sign-on server 102 can be any suitable server for storing user information and authenticating a user to a network based on the user information. For example, in some embodiments, sign-on server 102 can store a username corresponding to a user account to be used for authentication to the network, biometric signatures corresponding to the username, and/or any other suitable information. As another example, in some embodiments, sign-on server 102 can receive a biometric signature from a user of a user device and can compare the received biometric signature to a biometric signature sample to authenticate the user of the user device to a network, as described below in more detail in connection with FIG. 3.

Communication network 104 can be any suitable combination of one or more wired and/or wireless networks in some embodiments. For example, communication network 104 can include any one or more of the Internet, a mobile data network, a satellite network, a LAN, a WAN, a telephone network, a cable television network, a Wi-Fi network, a WiMax network, and/or any other suitable communication network.

User devices 106 and/or 108 can be any suitable user devices for transmitting a biometric signature, being authenticated to a network, and/or performing any other suitable functions. In some embodiments, user devices 106 and/or 108 can include mobile devices (e.g., a mobile phone, a laptop computer, a wearable computer, and/or any other suitable mobile device) and/or non-mobile devices (e.g., a desktop computer, a smart television, and/or any other suitable non-mobile devices).

Although only one server 102 is shown in FIG. 1 to avoid over-complicating the figure, any suitable number of servers can be used in some embodiments.

Figure 2:
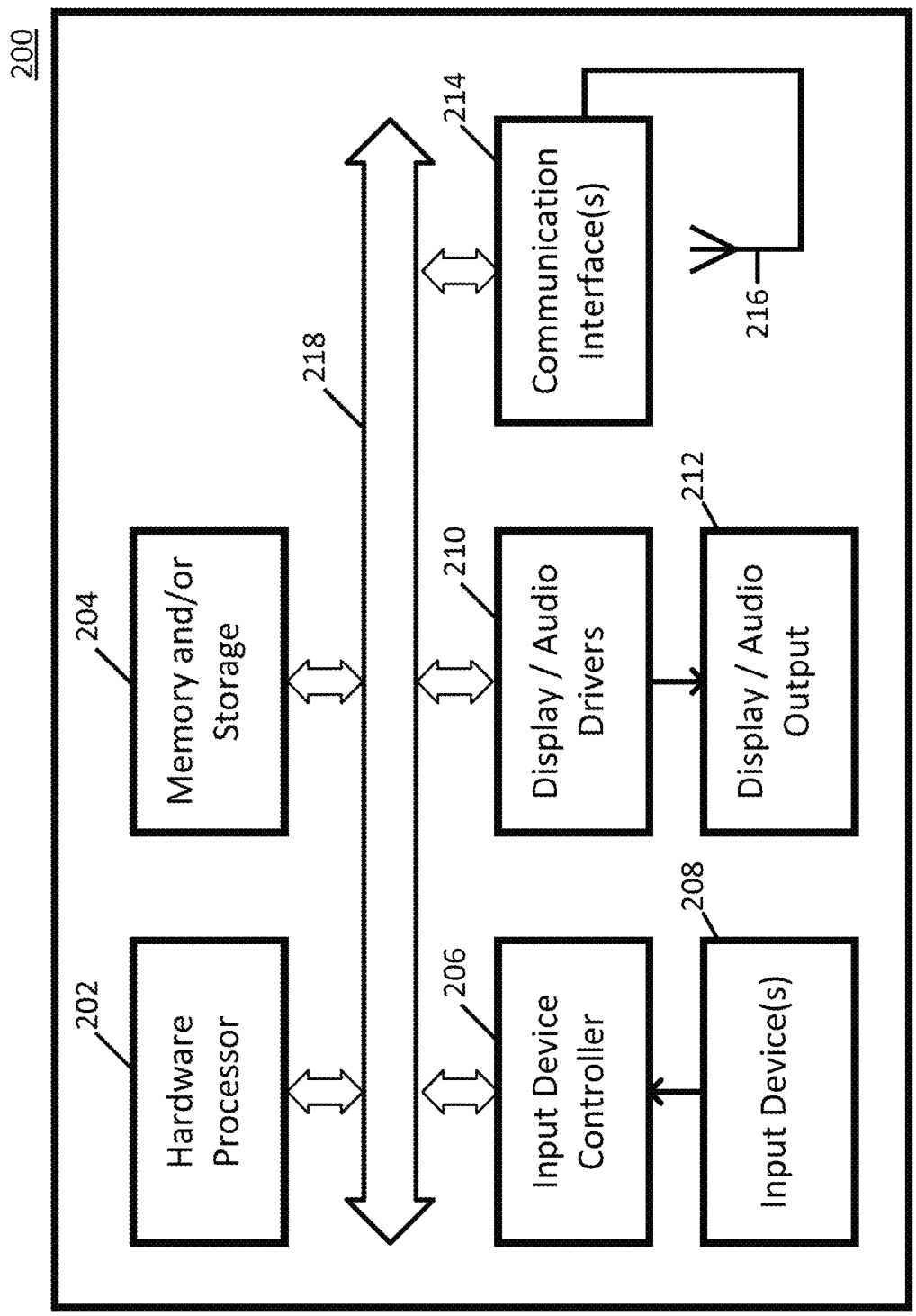
FIG. 2 shows an example of hardware that can be used in a server and/or a user device in accordance with some embodiments of the disclosed subject matter.

Sign-on server 102 and user devices 106 and 108 can be implemented using any suitable hardware in some embodiments. For example, in some embodiments, devices 102, 106, and 108 can be implemented using any suitable general purpose computer or special purpose computer. For example, sign-on server 102 may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 204 can be any suitable memory and/or storage for storing programs, data, media content, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from a device, such as input device 208, in some embodiments. For example, input device controller 206 can be circuitry for receiving input from an input device 208, such as a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving an LCD display, a speaker, an LED, or any other type of output device.

Communication interface(s) 214 can be any suitable circuitry for interfacing with one or more communication networks, such as network 104 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can be included in hardware 200 in accordance with some embodiments.

Figure 3:
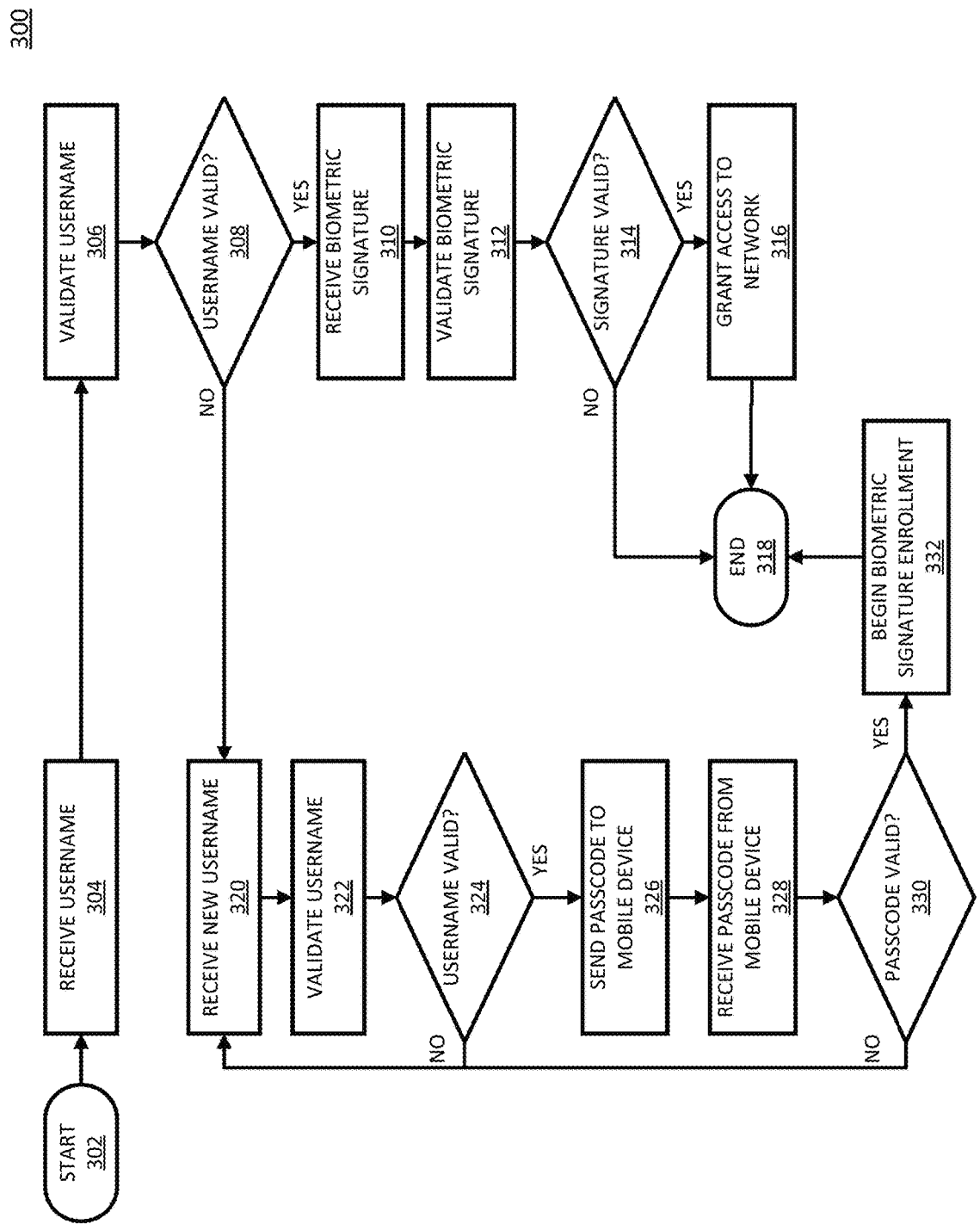
FIG. 3 shows an example of a process for authenticating users using biometric signatures in accordance with some embodiments of the disclosed subject matter.

Turning to FIG. 3, an example 300 of a process for granting access to a LAN and/or a WAN using biometric signature validation is shown in accordance with some embodiments of the disclosed subject matter.

Process 300 can begin at 302 and can receive a username corresponding to a user at 304. The username can be received in any suitable manner, for example, via a user interface. An example of a user interface for entering a username is user interface 400 of FIG. 4. As illustrated, user interface 400 can include a text entry input 410, which can receive text corresponding to the user name, and a sign in input 420, which can cause the entered username to be transmitted to sign-on server 102.

Process 300 can validate the username at 306, for example, by determining whether the username exists. As a more particular example, in some embodiments, process 300 can determine whether the username is included in a database of valid usernames (e.g., corresponding to users who have already selected usernames, and/or any other suitable valid usernames). Based on 306, process 300 can then determine if the username is valid at 308.

If, at 308, process 300 determines that the username is valid ("yes" at 308), process 300 can proceed to block 310 and can receive a biometric signature from a user of the user device. In some embodiments, the biometric signature can include any suitable biometric data, such as a fingerprint, retinal scan data, a voice signature, and/or any other suitable type of biometric data. In some embodiments, process 300 can cause a user interface to be presented on the user device that receives the biometric data. For example, in some embodiments, process 300 can cause a user interface that includes a touchscreen for receiving a fingerprint to be presented on the user device. In some embodiments, the user interface can include any suitable instructions for instructing the user to submit the biometric signature.

Process 300 can validate the biometric signature at 312 and can determine at 314 if the biometric signature is valid. Process 300 can validate the biometric signature in any suitable manner and using any suitable technique or combination of techniques. For example, in some embodiments, process 300 can compare a sample of the biometric signature received at block 310 to a biometric sample stored in a database in association with the validated username. As a more particular example, in some embodiments, process 300 can compare a portion of the received biometric signature to the biometric sample. As a specific example, in instances where the biometric signature includes a fingerprint, process 300 can compare any suitable portion of the received fingerprint to sample fingerprint data stored in the database that corresponds to the username. As another specific example, in instances where the biometric signature includes a voice signature, process 300 can compare frequency information of the received voice signature to frequency information of voice data corresponding to the username.

If, at 314, process 300 determines that the biometric signature is valid ("yes" at 314), process 300 can grant the user associated with the username access to the LAN or WAN at 316. For example, in some embodiments, process 300 can allow a user device used by the user to log in to the LAN or WAN. Process 300 can then end at 318.

If, at 314, process 300 determines that the biometric signature is not valid ("no" at 314), process 300 can end at 318. In some embodiments, process 300 can cause any suitable message to be presented on the user device that indicates that the biometric signature was not valid.

Figure 4:
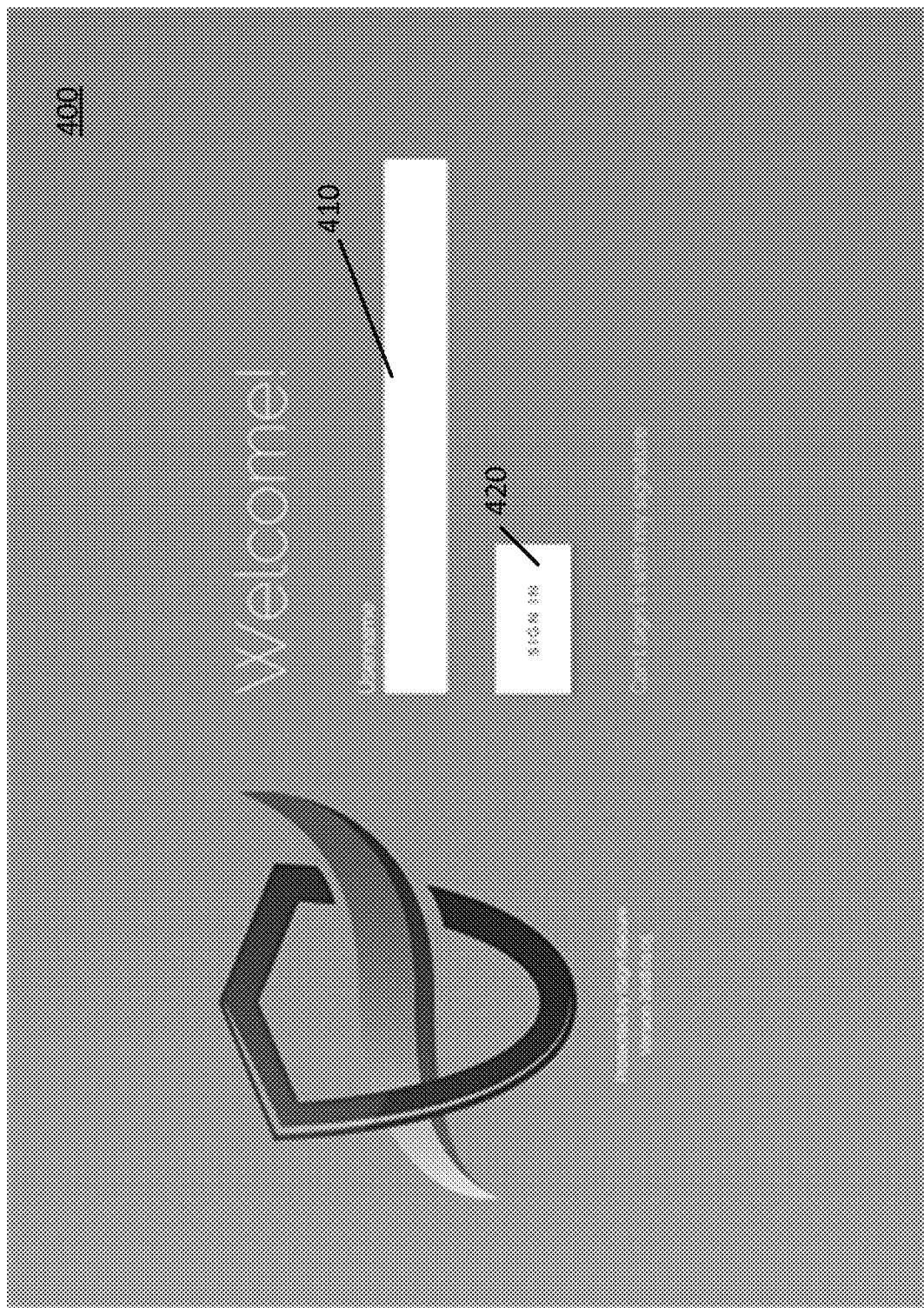
FIG. 4 shows an example of a user interface for entering a username in accordance with some embodiments of the disclosed subject matter.
Figure 5:
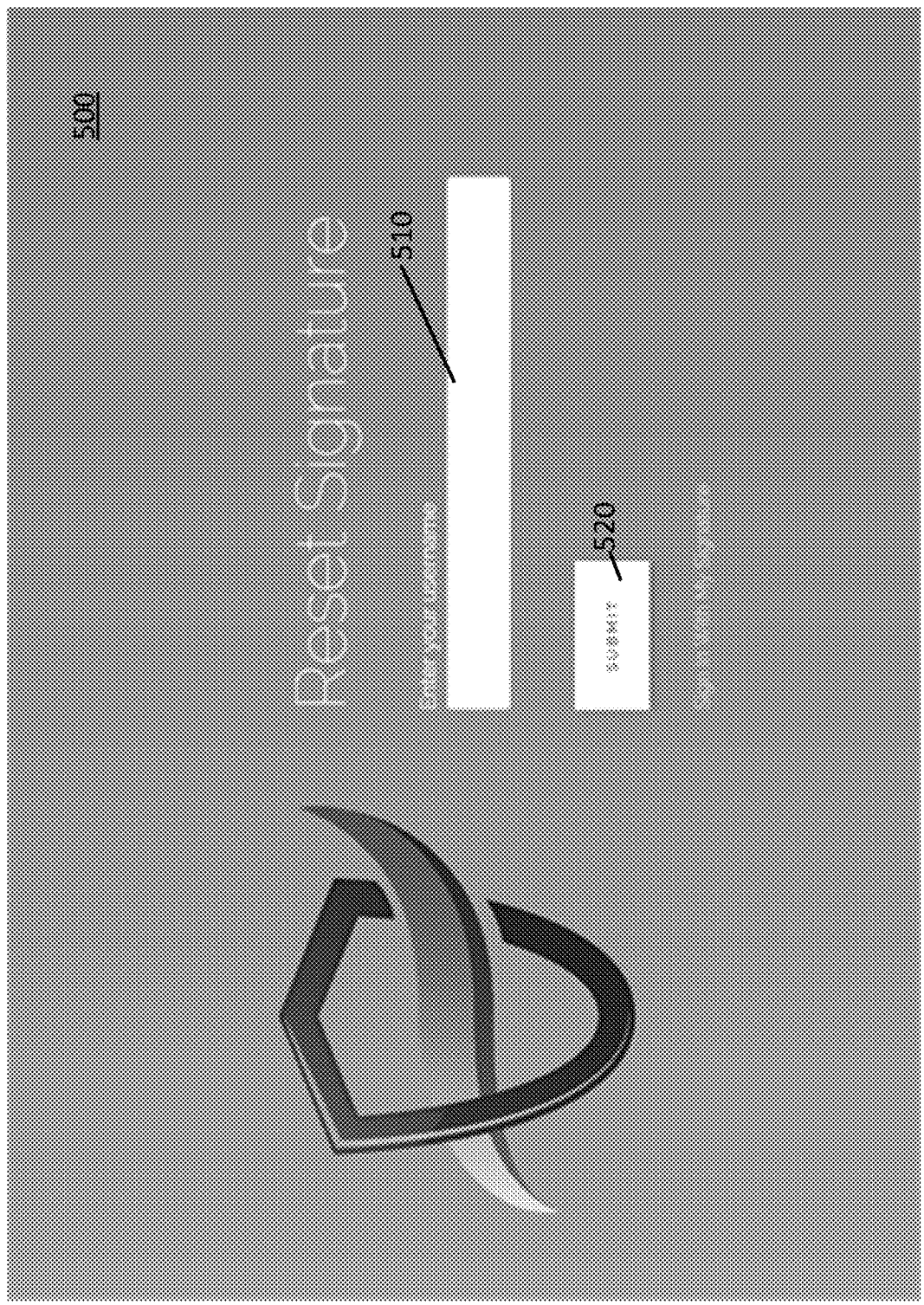
FIG. 5 shows an example of a user interface for creating a new username in accordance with some embodiments of the disclosed subject matter.

If, at 308, process 300 determines that the username is not valid ("no" at 308), process 300 can receive a new username at 320. In some embodiments, process 300 can present a user interface that allows a user to reset a username, such as user interface 500 as shown in FIG. 5. As illustrated, in some embodiments, user interface 500 can include a text entry input 510 that can be used to enter characters corresponding to a new username. Additionally, in some embodiments, user interface 500 can have a submit username button 520, that, when selected, can cause the characters entered in text entry input 510 to be transmitted to sign-on server 102. Note that, in some embodiments, user interface 500 can be presented in response to any suitable information. For example, in some embodiments, user interface 500 can be presented in response to determining that a username entered via user interface 400 of FIG. 4 is invalid. As another example, in some embodiments, user interface 500 can be presented in response to receiving an indication from a user that the user does not currently have a username.

Process 300 can validate the new username at 322 and can determine, at 324, whether the new username is valid. In some embodiments, process 300 can validate the new username using any suitable information and/or technique(s). For example, in some embodiments, process 300 can determine whether the new username already exists and corresponds to a different user. As a more particular example, in some embodiments, process 300 can determine whether the new username is included in a database of usernames stored on sign-in server 102. As another example, in some embodiments, process 300 can determine whether the new username satisfies particular criteria, such as a number of characters (e.g., more than a predetermined number of characters, fewer than a predetermined number of characters, and/or any other suitable length criteria), whether it includes particular characters that are not allowed in usernames, and/or any suitable criteria.

If, at 324, process 300 determines that the username is not valid ("no" at 324), process 300 can loop back to block 320 and can request a new username. In some embodiments, process 300 can indicate to the user one or more reasons the username was found to be invalid. For example, in some embodiments, process 300 can indicate that the entered username already exists and corresponds to a different user, that the entered username is too short or too long, that the entered username includes characters that are not allowed, and/or any other suitable information.

Figure 6:
FIG. 6 shows an example of a user interface for transmitting a passcode in accordance with some embodiments of the disclosed subject matter.

If, at 324, process 300 determines that the username is valid ("yes" at 324), process 300 can proceed to block 326 and can cause a passcode to be transmitted to the user device. In some embodiments, the passcode can be transmitted in any suitable manner, for example, by text message, e-mail, and/or in any other suitable manner. In some embodiments, the passcode can be in any suitable format (e.g., a series of numbers, a series of letters, a series of alphanumeric characters, and/or in any other suitable format). Furthermore, in some embodiments, the passcode can be of any suitable length (e.g., one character, two characters, four characters, and/or any other suitable length). Note that, in some embodiments, process 300 can transmit the passcode to the user device in response to receiving an indication from a user of the user device that the user wants to receive the passcode. For example, in some embodiments, the indication can be received via a send passcode button 610 as shown in a user interface 600 of FIG. 6.

Figure 7:
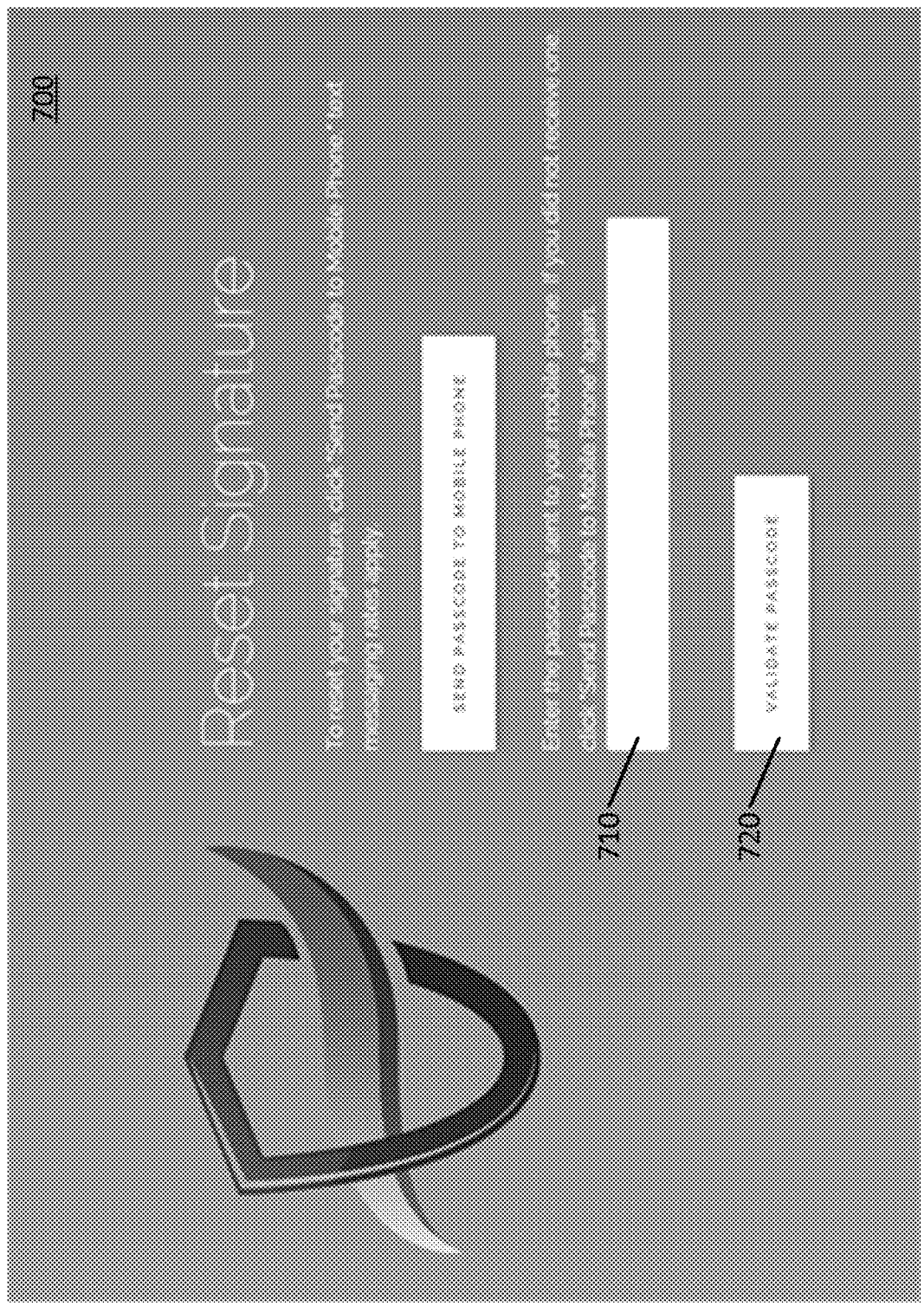
FIG. 7 shows an example of a user interface for receiving a passcode in accordance with some embodiments of the disclosed subject matter.

At 328, process 300 can receive, from the user device, characters from the user device corresponding to the transmitted passcode. For example, in some embodiments, the characters can be received via a user interface 700 as shown in FIG. 7. As illustrated, user interface 700 can include a text entry input 710 for a user to enter characters corresponding to the received passcode, and a submit button 720 for transmitting the entered characters to sign-on server 102. Note that, in some embodiments, user interface 700 can be presented in response to any suitable information. For example, in some embodiments, user interface 700 can be presented in response to receiving an indication that send passcode button 610 was selected on the user device, that the passcode was transmitted by process 300 at block 326, and/or based on any other suitable information.

Process 300 can determine whether the passcode received at block 328 is valid at block 330. For example, in some embodiments, process 300 can determine whether the passcode received at block 328 matches the passcode transmitted by sign-on server 102 at block 326.

If, at 330, process 300 determines that the passcode is not valid ("no" at 330), process 300 can loop back to block 320 and can receive a new username. Alternatively, in some embodiments, process 300 can loop back to block 326 and can cause a new passcode to be transmitted to the user device.

Figure 8:
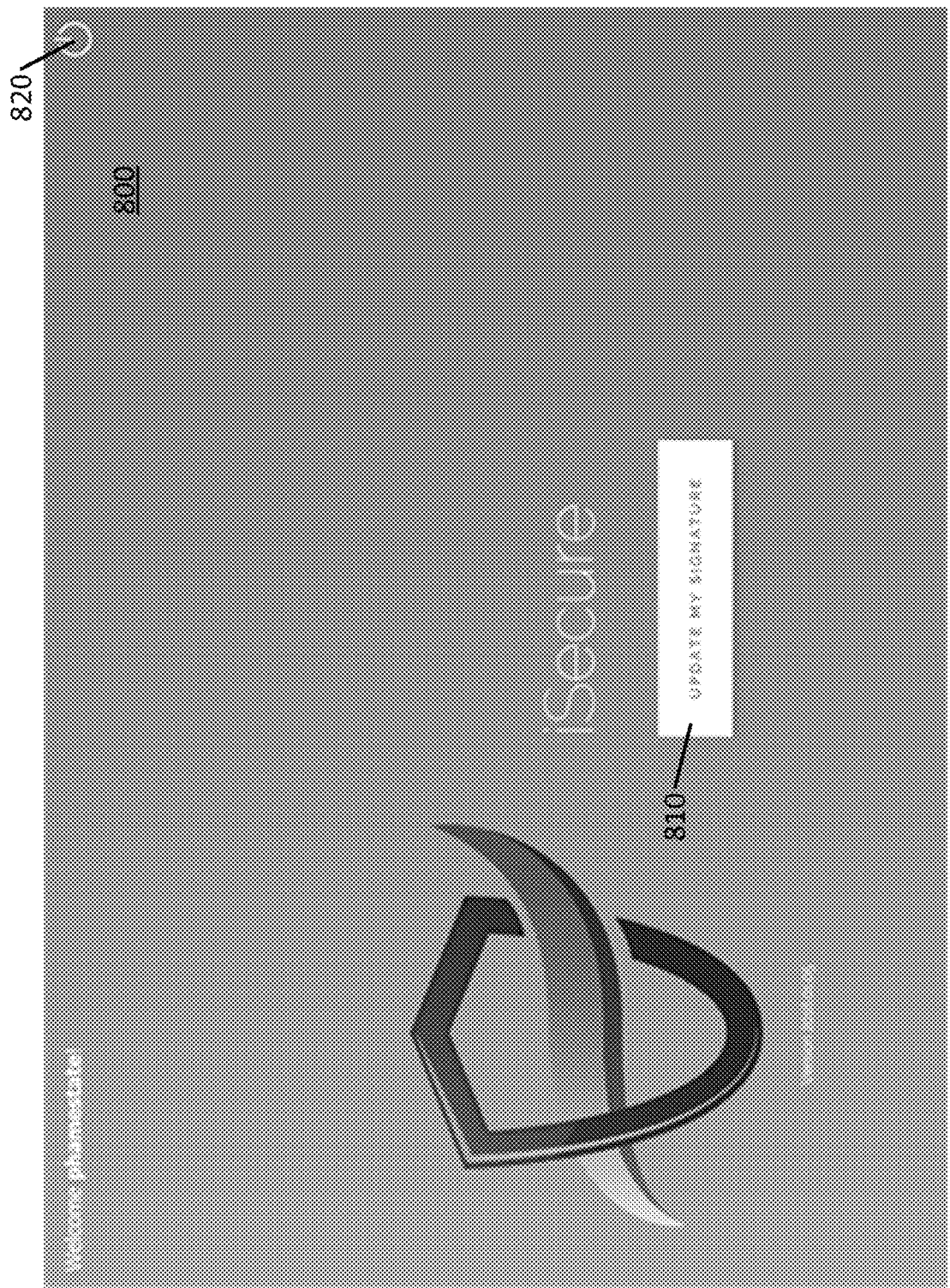
FIG. 8 shows an example of a user interface for updating a biometric signature in accordance with some embodiments of the disclosed subject matter.

If, at 330, process 300 determines that the passcode is valid ("yes" at 330), process 300 can receive a biometric signature to be associated with the new username at 332. In some embodiments, process 300 can cause a user interface 800 as shown in FIG. 8 to be presented on the user device, which can include a collect signature input 810. In some embodiments, selection of collect signature input 810 can cause process 300 to receive the biometric signature, for example, by presenting a user interface that receives a fingerprint, by activating a microphone of the user device to collect a voice signature, and/or receives the biometric signature in any other suitable manner. In some embodiments, the received biometric signature can then be stored in association with the new username created at block 320. Note that, in some embodiments, after the biometric signature has been associated with the new username, a user of user interface 800 can select a log out input 820, which can cause the user to be logged out of the user account.

Process 300 can then end at 318.

It should be understood that at least some of the above described blocks of the process of FIG. 3 can be executed or performed in any order or sequence not limited to the order and sequence shown in and described in the figure. Also, some of the above blocks of the process of FIG. 3 can be executed or performed substantially simultaneously where appropriate or in parallel to reduce latency and processing times. Additionally or alternatively, some of the above described blocks of the process of FIG. 3 can be omitted.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for authenticating users using biometric signatures are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for authenticating users connecting to at least one of a local area network and a wide area network using biometric signatures, comprising:
   creating a first new user account corresponding to a first user device, comprising:
      receiving a first username from the first user device;
      transmitting, by a hardware processor to the first user device, a first passcode;
      receiving, by the hardware processor from the first user device, a version of the first passcode;
      determining whether the version of the first passcode matches the first passcode transmitted to the first user device;
      in response to determining that the version of the first passcode matches the first passcode transmitted to the first user device, receiving a first biometric sample corresponding to a first user of the first user device; and
      storing the first biometric sample in association with the first username; and
   as part of non-account-configuration connecting of the first user device to the at least one of a local area network and a wide area network:
      receiving, from the first user device, an indication that the first user device is to be connected to the at least one of a local area network and a wide area network;
      in response to receiving the indication, causing a captive portal to be presented on the first user device that receives the first username corresponding to the first user of the first user device;
      receiving, from the first user device, a second biometric sample corresponding to the first user of the first user device;
      determining whether the second biometric sample matches the first biometric sample; and
      in response to determining that the second biometric sample matches the first biometric sample, granting access to the at least one of a local area network and a wide area network.

2. The method of claim 1, further comprising determining whether the first username corresponding to the first user of the first user device is included in a stored database of usernames, wherein receiving the second biometric sample is in response to determining that the first username is included in the stored database of usernames.

3. The method of claim 1, further comprising:
   determining that a second new user account corresponding to a second user device is to be created;
   in response to determining that the second new user account is to be created, receiving a second new username from the second user device;
   receiving a third biometric sample corresponding to a second user of the second user device; and
   storing the third biometric sample in association with the second username.

4. The method of claim 3, further comprising:
   transmitting, to the second user device, a second passcode; and
   receiving, from the second user device, a version of the second passcode, wherein receiving the third biometric sample corresponding to the second user of the second user device is in response to the version of the second passcode matching the second passcode transmitted to the second user device.

5. The method of claim 3, further comprising validating the second new username received from the second user device.

6. The method of claim 1, wherein the first biometric sample is a voice signate.

7. A system for authenticating users connecting to at least one of a local area network and a wide area network using biometric signatures, the system comprising:
   a hardware processor that is programmed to:
      creating a first new user account corresponding to a first user device, comprising:
         receive a first username from the first user device;
         transmit, to the first user device, a first passcode;
         receive, from the first user device, a version of the first passcode;

determine whether the version of the first passcode matches the first passcode transmitted to the first user device;

in response to determining that the version of the first passcode matches the first passcode transmitted to the first user device, receive a first biometric sample corresponding to a first user of the first user device; and store the first biometric sample in association with the first username; and as part of non-account-configuration connecting of the first user device to the at least one of a local area network and a wide area network:

receive, from the first user device, an indication that the first user device is to be connected to the at least one of a local area network and a wide area network;

in response to receiving the indication, cause a captive portal to be presented on the first user device that receives the first username corresponding to the first user of the first user device;

receive, from the first user device, a second biometric sample corresponding to the first user of the first user device;

determine whether the second biometric sample matches the first biometric sample; and in response to determining that the second biometric sample matches the first biometric sample, grant access to the at least one of a local area network and a wide area network.

8. The system of claim 7, wherein the hardware processor is further programmed to determine whether the first username corresponding to the first user of the first user device is included in a stored database of usernames, wherein receiving the second biometric sample is in response to determining that the first username is included in the stored database of usernames.

9. The system of claim 7, wherein the hardware processor is further programmed to:

determine that a second new user account corresponding to a second user device is to be created;

in response to determining that the second new user account is to be created, receive a second new username from the second user device;

receive a third biometric sample corresponding to a second user of the second user device; and store the third biometric sample in association with the second username.

10. The system of claim 9, wherein the hardware processor is further programmed to:

transmit, to the second user device, a second passcode; and receive, from the second user device, a version of the second passcode, wherein receiving the third biometric sample corresponding to the second user of the second user device is in response to the version of the second passcode matching the second passcode transmitted to the second user device.

11. The system of claim 9, wherein the hardware processor is further programmed to validate the second new username received from the second user device.

12. The system of claim 9, wherein the first biometric sample is a voice signate.

13. A non-transitory computer-readable medium containing computer executable instructions that, when executed by a processor, cause the processor to perform a method for authenticating users connecting to at least one of a local area network and a wide area network using biometric signatures, the method comprising:

creating a first new user account corresponding to a first user device, comprising:

receiving a first username from the first user device;

transmitting, by a hardware processor to the first user device, a first passcode;

receiving, by the hardware processor from the first user device, a version of the first passcode;

determining whether the version of the first passcode matches the first passcode transmitted to the first user device;

in response to determining that the version of the first passcode matches the first passcode transmitted to the first user device, receiving a first biometric sample corresponding to a first user of the first user device; and storing the first biometric sample in association with the first username; and as part of non-account-configuration connecting of the first user device to the at least one of a local area network and a wide area network:

receiving, from the first user device, an indication that the first user device is to be connected to the at least one of a local area network and a wide area network;

in response to receiving the indication, causing a captive portal to be presented on the first user device that receives the first username corresponding to the first user of the first user device;

receiving, from the first user device, a second biometric sample corresponding to the first user of the first user device;

determining whether the second biometric sample matches the first biometric sample; and in response to determining that the second biometric sample matches the first biometric sample, granting access to the at least one of a local area network and a wide area network.

14. The non-transitory computer-readable medium of claim 13, wherein the method further comprises determining whether the first username corresponding to the first user of the first user device is included in a stored database of usernames, wherein receiving the second biometric sample is in response to determining that the first username is included in the stored database of usernames.

15. The non-transitory computer-readable medium of claim 13, wherein the method further comprises:

determining that a second new user account corresponding to a second user device is to be created;

in response to determining that the second new user account is to be created, receiving a second new username from the second user device;

receiving a third biometric sample corresponding to a second user of the second user device; and storing the third biometric sample in association with the second username.

16. The non-transitory computer-readable medium of claim 15, wherein the method further comprises:

transmitting, to the second user device, a second passcode; and receiving, from the second user device, a version of the second passcode, wherein receiving the third biometric sample corresponding to the second user of the second user device is in response to the version of the second passcode matching the second passcode transmitted to the second user device.

17. The non-transitory computer-readable medium of claim 15, wherein the method further comprises validating the second new username received from the second user device.

18. The non-transitory computer readable medium of claim 17, wherein the first biometric sample is a voice signate.

\* \* \* \* \*